Oct. 7, 1969  L. M. JOHNSTON, JR., ET AL  3,470,763
GEAR SHIFT LEVER ASSEMBLY WITH ENERGY
ABSORPTION CHARACTERISTIC
Filed Dec. 7, 1967
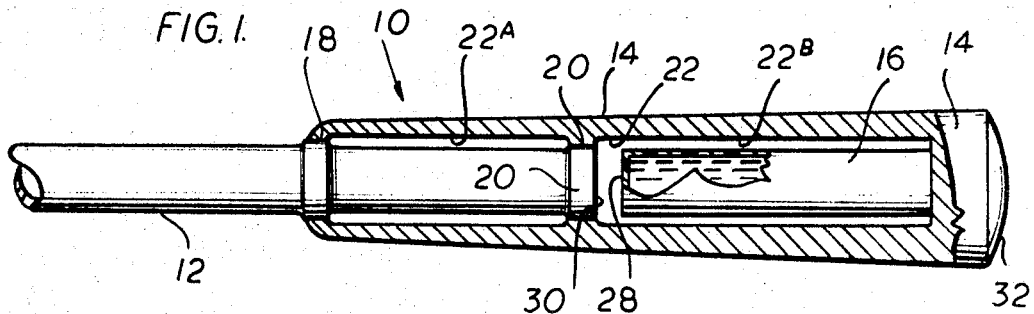
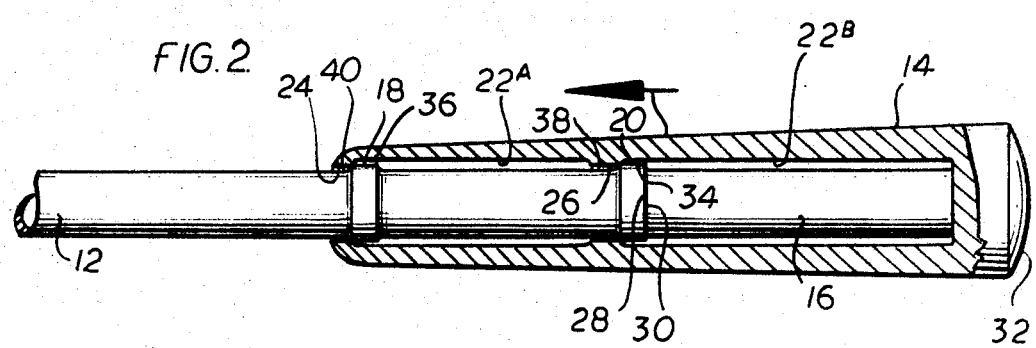
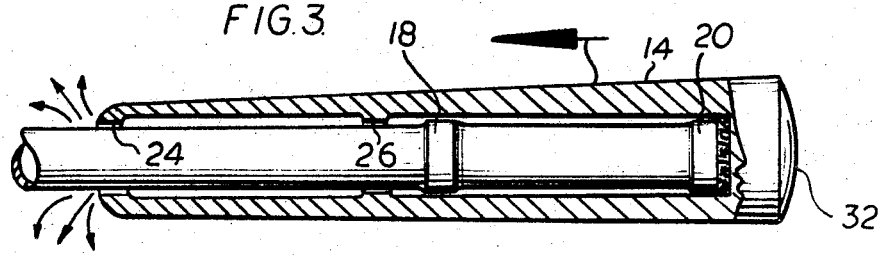
INVENTORS
LAWRENCE M. JOHNSTON, JR.
ROBERT L. DOWLER
ATT'Y United States Patent Office 3,470,763
Patented Oct. 7, 1969

3,470,763
GEAR SHIFT LEVER ASSEMBLY WITH ENERGY ABSORPTION CHARACTERISTIC
Lawrence M. Johnston, Jr., and Robert L. Dowler, Fort Wayne, Ind., assignors to International Harvester Company, Chicago, Ill., a corporation of Delaware
Filed Dec. 7, 1967, Ser. No. 688,888
Int. Cl. F16d 57/00; G05g 1/04
U.S. Cl. 74—525     8 Claims

ABSTRACT OF THE DISCLOSURE

A gear shift level designed in collapsible form as a safety measure to prevent injury to a vehicle occupant who might be thrown against the end thereof. The lever assembly incorporates a fluid filled collapsible container which is rupturable upon being subjected to a predetermined force and the fluid is expelled from the assembly at a controlled rate to act as a shock absorber or dampening means to absorb the energy of a blow delivered to the end of the lever assembly.

---

This invention relates to a gear shift lever assembly and more particularly to such a unit designed to be collapsible as a safety feature.

Experience has shown that in accidents involving automotive vehicles an occupant often is thrown sideways against the end of a steering column mounted gear shift lever. Such a lever, as is well known, generally protrudes out to the right in American cars and trucks having the steering wheel located on the left side. Government officials have been concerned about remedying this automotive safety problem as well as many others.

It is a principal object of this invention to incorporate in a gear shift lever assembly energy absorbing means which would be effective to absorb a major portion of the energy of a blow delivered to the end of the gear shift lever assembly.

Another object is to provide a gear shift lever assembly which is collapsible in part and which during such collapsing is effective to absorb the energy of a blow applied to the free end.

Another object is to provide a gear shift lever assembly including means for confining fluid therein and means for restricting the outflow of fluid therefrom when fluid is released from such confining means.

A still further object is to provide a gear shift lever assembly which is collapsible in part and which includes a rupturable and collapsible fluid filled container, such that a blow of greater than a predetermined force will rupture the container, collapse it and expel the fluid therefrom at a controlled rate.

The above and other objects and advantages of the invention will be more readily apparent when read in conjunction with the accompanying drawings in which:

FIGURE 1 is a view partially in section illustrating a gear shift lever assembly in its normal fully extended position;

FIGURE 2 is a view partially in section showing the assembly of FIGURE 1 in a partially collapsed condition;

FIGURE 3 is a view partially in section showing the assembly of FIGURE 1 in a fully collapsed condition.

Referring now to the drawings, 10 shows a gear shift lever assembly comprising a lever arm shown in part at 12, a handle 14 telescoped over the outer end of lever arm 12 and a sealed collapsible fluid filled container 16. The outer end only of the lever arm 12 is shown in the FIGURES 1–3, and it will be apparent the left end thereof, shown here only in part, is adapted to be connected to a steering column of a vehicle or a transmission control unit mounted on or near the vehicle steering column. The lever arms 12 preferably comprises a round rod or tubular member. A pair of axially spaced circumferentially extending lands 18 and 20 are formed on the lever arm.

The handle 14 has an axially extending bore 22 formed therein having two bore portions 22a and 22b which together may extend almost the full length of handle 14. Axially spaced radially inwardly extending lands 24 and 26 are formed in the bore 22, the land 24 being formed at the outer end of bore 20 and the land 26 being formed inwardly from land 24 and separating bore portions 22a and 22b. Lands 24 and 26 are spaced the same distance apart as lands 18 and 20 for reasons which will become more apparent. In their normal assembled relation, the handle 14 and lever arm 12 are fixed to each other by means of frictional engagement established by a tight interference fit existing between the lands 18 and 20 and the lands 24 and 26 on the lever arm and handle respectively. The lands 24 and 26 preferably extend but a small distance inwardly from the cylinder walls of bore portions 22a and 22b for reasons which will become more apparent.

The bore portion 22b forms a chamber for holding the collapsible fluid filled container 16. The container 16 preferably is of such a length that it extends nearly the full length of the bore portion 22b. As will be seen from FIGURE 2, the length of container 16 is such that the end 28 thereof comes into contact with the end 30 of lever arm 12 when the handle 14 is moved far enough to the left onto the lever arm 12 to disengage the land 26 from the land 20 on lever arm 12. The container 16 may be made of a very thin rupturable metal and preferably contains a fluid such as oil. The container could also be made of other material which is easily fracturable such as plastic, for example. The container must be easily rupturable so that when a blow of greater than a predetermined force on the end 32 of handle 14 is sufficient to dislodge the handle 14 from its tight interference fit on the lever arm 12 through the lands 18, 20, 24 and 26, the handle will continue to move to the left rupturing the container 16. This movement of handle 14 will force fluid from the ruptured container to flow past lands 20, 26, 18 and 24 in that order and out of the bore 20.

The radial distance between the cylinder wall of bore portion 22b and land 20 is small enough to provide a moving orifice-like outlet or opening 34 for the fluid when the container is ruptured and the lever arm 12 moves relatively further into bore portion 22b. This orifice-like outlet 34 provides a restriction for the fluid and thereby controls the rate at which the handle 14 can be moved to the left onto lever arm 12. A second and similar moving orifice-like outlet or opening 36 for the fluid forced out of container 16 is defined by the land 18 and the wall of bore portion 22a. Here again it will be observed that this outlet 36 will also restrict the discharge of fluid from the bore 22. Further orifice-like openings 38 and 40 are provided by the lands 24 and 26 acting in cooperation with the outer surface of lever arm 12. It will be apparent that variation of the size of these outlets 34 and 36 will control the rate of discharge of fluid and consequently the damping effect of fluid in the bore 22.

The interference fit of the handle 14 on the lever arm 12 through the various lands described above will be effective as the first means to initially absorb some of the energy of a blow on the end 32 of the handle. This interference fit is designed to give way under a predetermined force on the end of handle 14. Additional energy will be absorbed by the collapse of the container 16 and the controlled rate of discharge of fluid from the container in the manner described above. One of the real benefits of the latter is the elimination of a second impact force on the end of the handle 14 when telescoping of the parts ceases. The energy of the impact on the handle end is gradually absorbed by discharging fluid, the fluid acting as a damping medium.

While the unit described utilized the lands 18, 20, 24 and 26 to define in part orifice-like openings to control the rate of discharge of fluid from the bore 22, it is contemplated that other orifice means may be associated with the assembly through which the fluid could be discharged at a controlled rate to act as a damping means.

While the unit here described illustrates the lever arm 12 somewhat as a plunger which moves relatively into the bore 20 of the handle, it will be appreciated that the same results could be accomplished by the reverse type of assembly. In such assembly the bore would be formed in the right end of the lever arm 12 and the handle would be formed with a plunger portion telescoping into the bore of the lever arm.

The container 16 could also be filled with compressed air or other gas which would be emitted at a controlled rate upon fracturing of the container.

While the operation of the gear shift lever assembly 10 is undoubtedly clear from the description of the construction, the operation will be summarized briefly. When a force greater than a predetermined amount is applied to the end 32 of the direction indicated by the arrows, the force will be partially absorbed by the breaking of the interference fit between the handle 14 and lever arm 12. Then the additional energy of the force will be absorbed in the fracturing and collapsing of the container 16 and the controlled rate of expelling the fluid from the bore 22 as the handle 14 moves to the left as viewed in the figures. Eventually the container 16 may be completely collapsed.

While a preferred embodiment of the invention has been specifically disclosed, it is to be understood that the invention is not limited thereto as other variations will be apparent to those skilled in the art and the invention is to be given its fullest possible interpretation within the terms of the following claims.

I claim:

1. A motor vehicle gear shift lever assembly comprising: an elongated lever having one end adapted to be operatively connected to a vehicle transmission system; a hollow handle having one end closed, said handle projecting from the opposite end portion of said lever in slidable telescopic relation therewith; connecting means releasably securing said handle to said lever end portion in a normal position, said connecting means being frangible to permit said handle to slide with respect to said lever in one direction substantially along the longitudinal axis of said lever toward a collapsed position upon the application of a longitudinal force of a predetermined magnitude to said handle; and energy absorption means disposed entirely within said handle, said energy absorption means being responsive to longitudinal sliding movement of said handle with respect to said lever in said one direction of a predetermined amount to yieldably resist further relative sliding movement between said lever and handle.

2. A motor vehicle gear shift lever assembly as set forth in claim 1, wherein said connecting means includes annular land means carried by said lever and annular land means carried by said handle, said land means being in frictional engagement with each other with an interference fit when said handle is in its normal position.

3. A motor vehicle gear shift lever assembly as set forth in claim 2, wherein said annular land means carried by said lever includes an annular, radially outwardly extending land integrally formed with and at an end of said lever and wherein said land means carried by said handle includes an annular, radially inwardly extending land integrally formed with said handle, said radially inwardly extending land being longitudinally spaced from said closed end of said handle, and said energy absorption means being disposed between said closed end of said handle and said radially inwardly extending land.

4. A motor vehicle gear shift lever assembly as set forth in claim 3, wherein said energy absorption means comprises a rupturable and collapsible fluid-filled container, and orifice means for controlling the rate of fluid flow from within said handle after rupture of said container during continued longitudinal sliding movement of said handle with respect to said lever in said one direction beyond said predetermined amount.

5. A motor vehicle gear shift lever assembly as set forth in claim 4, wherein said orifice means is defined at least in part by said land integrally formed with one of said lever and said handle.

6. A motor vehicle gear shift lever assembly as set forth in claim 2, wherein said annular land means carried by said lever includes a plurality of longitudinally spaced, radially outwardly extending, integrally formed lands, one of said lands being disposed at an end of said lever and wherein said land means carried by said handle includes a plurality of longitudinally spaced, radially inwardly extending, integrally formed lands, and said energy absorption means being disposed between said closed end of said handle and said radially outwardly extending land disposed at said end of said lever.

7. A motor vehicle gear shift lever assembly as set forth in claim 6, wherein said energy absorption means comprises a rupturable and collapsible fluid-filled container, and orifice means for controlling the rate of fluid flow from within said handle after rupture of said container during continued longitudinal sliding movement of said handle with respect to said lever in said one direction beyond said predetermined amount.

8. A motor vehicle gear shift lever assembly as set forth in claim 7, wherein said orifice means is partially defined by all of said lands.

References Cited

UNITED STATES PATENTS

| | | | |
|---|---|---|---|
| 627,227 | 6/1899 | Fenton | 74—551.9 |
| 1,568,911 | 1/1926 | O'Brien | 74—551.9 XR |
| 3,097,725 | 7/1963 | Peterson. | |

FRED C. MATTERN, JR., Primary Examiner

E. D. SHOEMAKER, Assistant Examiner